United States Patent
Markus et al.

(10) Patent No.: US 9,459,469 B2
(45) Date of Patent: Oct. 4, 2016

(54) SYSTEM FOR CONTACT LENS WIRELESS COMMUNICATION

(71) Applicants: David T. Markus, Irvine, CA (US); Michael C. Hayes, Irvine, CA (US)

(72) Inventors: David T. Markus, Irvine, CA (US); Michael C. Hayes, Irvine, CA (US)

( * ) Notice: Subject to any disclaimer, the term of this patent is extended or adjusted under 35 U.S.C. 154(b) by 0 days.

(21) Appl. No.: 14/668,957

(22) Filed: Mar. 25, 2015

(65) Prior Publication Data
US 2015/0281411 A1 Oct. 1, 2015

Related U.S. Application Data

(60) Provisional application No. 61/970,335, filed on Mar. 25, 2014.

(51) Int. Cl.
| | | |
|---|---|---|
| H04B 1/00 | (2006.01) | |
| H04B 7/00 | (2006.01) | |
| H04B 1/46 | (2006.01) | |
| G02C 7/04 | (2006.01) | |
| G02C 11/00 | (2006.01) | |

(52) U.S. Cl.
CPC .................. *G02C 7/04* (2013.01); *G02C 11/10* (2013.01)

(58) Field of Classification Search
CPC ...................................................... H04B 1/385
USPC ................ 455/70, 90.3; 351/159.03, 159.39, 351/159.4, 209, 210
See application file for complete search history.

(56) References Cited

U.S. PATENT DOCUMENTS

| | | | | | |
|---|---|---|---|---|---|
| 5,555,504 | A * | 9/1996 | Lepper | ................ | G05B 19/4183 700/115 |
| 8,252,605 | B2 * | 8/2012 | Janzen | ............ | G01N 33/54333 436/518 |
| 8,628,194 | B2 * | 1/2014 | Sabeta | ............. | G06K 19/07758 351/159.01 |
| 8,857,983 | B2 * | 10/2014 | Pugh | ..................... | A61F 2/1635 351/159.03 |
| 2004/0203478 | A1 * | 10/2004 | Scott | ..................... | G06K 7/0008 455/70 |
| 2007/0200724 | A1 * | 8/2007 | Lazo | .................. | G06K 7/10336 340/693.1 |
| 2007/0274626 | A1 * | 11/2007 | Sabeta | ................. | A45C 11/005 385/24 |
| 2013/0194540 | A1 * | 8/2013 | Pugh | ..................... | A61F 2/1635 351/159.03 |
| 2014/0243645 | A1 * | 8/2014 | Leonardi | ............. | A61B 5/6821 600/398 |
| 2014/0306361 | A1 * | 10/2014 | Pugh | ..................... | A61F 2/1635 264/1.7 |
| 2015/0062533 | A1 * | 3/2015 | Toner | .................... | G02C 7/049 351/209 |
| 2015/0087249 | A1 * | 3/2015 | Pugh | ..................... | H04B 1/385 455/90.3 |
| 2015/0335420 | A1 * | 11/2015 | Blum | ....................... | A61F 2/16 623/6.22 |
| 2015/0362749 | A1 * | 12/2015 | Biederman | ........... | G02C 7/083 351/209 |
| 2015/0362750 | A1 * | 12/2015 | Yeager | ................... | G02C 7/083 351/209 |
| 2015/0362751 | A1 * | 12/2015 | Biederman | ........... | G02C 7/083 349/13 |
| 2015/0362752 | A1 * | 12/2015 | Linhardt | .................. | G02C 7/04 349/13 |
| 2015/0362753 | A1 * | 12/2015 | Pletcher | ................. | G02C 7/083 351/159.03 |
| 2015/0362754 | A1 * | 12/2015 | Etzkorn | ................. | G02C 7/083 351/159.03 |
| 2015/0362755 | A1 * | 12/2015 | Lee | .......................... | G02C 7/04 351/159.4 |
| 2015/0362756 | A1 * | 12/2015 | Wiser | .................... | G02C 7/083 351/210 |
| 2015/0378177 | A1 * | 12/2015 | Blum | .................... | A61F 2/1616 351/159.39 |

* cited by examiner

*Primary Examiner* — William D Cumming
(74) *Attorney, Agent, or Firm* — Kafantaris Law Offices; Theo Kafantaris

(57) ABSTRACT

The present invention will provide a vision correction device which makes use of wireless transmissions and/or wireless charging to transfer data between the vision correction device and an external device. More specifically, the present invention will incorporate radio frequency technology onto a contact lens, including passive and active embodiments, and may further include wireless charging capability. This is accomplished by positioning an extremely small RF device onto a contact lens, along with an antenna and/or battery, and using a fluid medium to enhance the signal to and from an external device.

11 Claims, 3 Drawing Sheets

SYSTEM FOR CONTACT LENS WIRELESS COMMUNICATION

CROSS-REFERENCE TO RELATED APPLICATIONS

This application claims the benefit of U.S. Provisional Patent Application No. 61/970,335, filed on Mar. 25, 2014, and incorporated herein by reference.

STATEMENT REGARDING FEDERALLY SPONSORED RESEARCH AND DEVELOPMENT

Not Applicable.

FIELD OF THE INVENTION

This invention relates generally to wireless communication with a contact lens, and more particularly, to a system and method for transferring data from a contact lens using radio frequencies.

DISCUSSION OF RELATED ART

Wireless transmission of data varies greatly, from one-way broadcast systems such as radio and television signals to two way systems such as Wi-Fi and cellular signals. One type of wireless transmission, radio-frequency identification, or RFID, utilizes electromagnetic or electrostatic fields to transfer data. An RFID device utilizes an antenna and a transceiver to read the radio frequency and transfer information to an external device, and a transponder, or tag, which contains the circuitry of the RFID and the data to be transmitted.

RFID is advantageous over other types of wireless transmission in that it does not require a power source to transmit data. Consequently, RFID transmission is limited to a short range and limited data transfer. As such, RFID is most commonly used for automatically identifying and tracking tags attached to objects, such as clothing, livestock, pets, assembly lines, pharmaceuticals, etc. Powered RFID systems can solve many of the unpowered RFID shortcomings by increasing range and reduced interference.

The human eye, in very simplistic terms, is adapted to provide vision by detecting and converting light into electrical impulses for the brain. While the human eye is extremely intricate and precise, the image produced often needs correction. The most common type of vision correction includes glasses and/or contact lenses, which are used to improve vision by correcting refractive error. This is done by directly focusing the light so that it enters the eye with the proper intensity.

While radio frequency technology has made its way into several industries, size and interference constrains have prevented them from entering into fields such as contact lenses, where size limitations are paramount. Therefore, there is a continued need for a vision correction device which makes use of wireless transmissions and/or wireless charging to transfer data between the vision correction device and an external device.

SUMMARY OF THE INVENTION

The present invention will provide a vision correction device which makes use of wireless transmissions and/or wireless charging to transfer data between the vision correction device and an external device. More specifically, the present invention will incorporate radio frequency technology onto a contact lens, including passive and active embodiments, and may further include wireless charging capability. This is accomplished by positioning an extremely small RF device onto a contact lens, along with an antenna and/or battery, and using a fluid medium to enhance the signal to and from an external device.

When in use, the RF device is adapted to provide identifying information, such as which batch a lens is from and when it was manufactured. Furthermore, the RF device is adapted to notify the user when it is time to dispose of the contact lens, either from time or usage statistics. The RFID device will transmit this information either passively or actively to an external device, providing the user with invaluable information relating to their vision. The RF device can further communicate charging information such as charging states, charging rate, and other relevant information when wireless charging is used.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Figure 1:
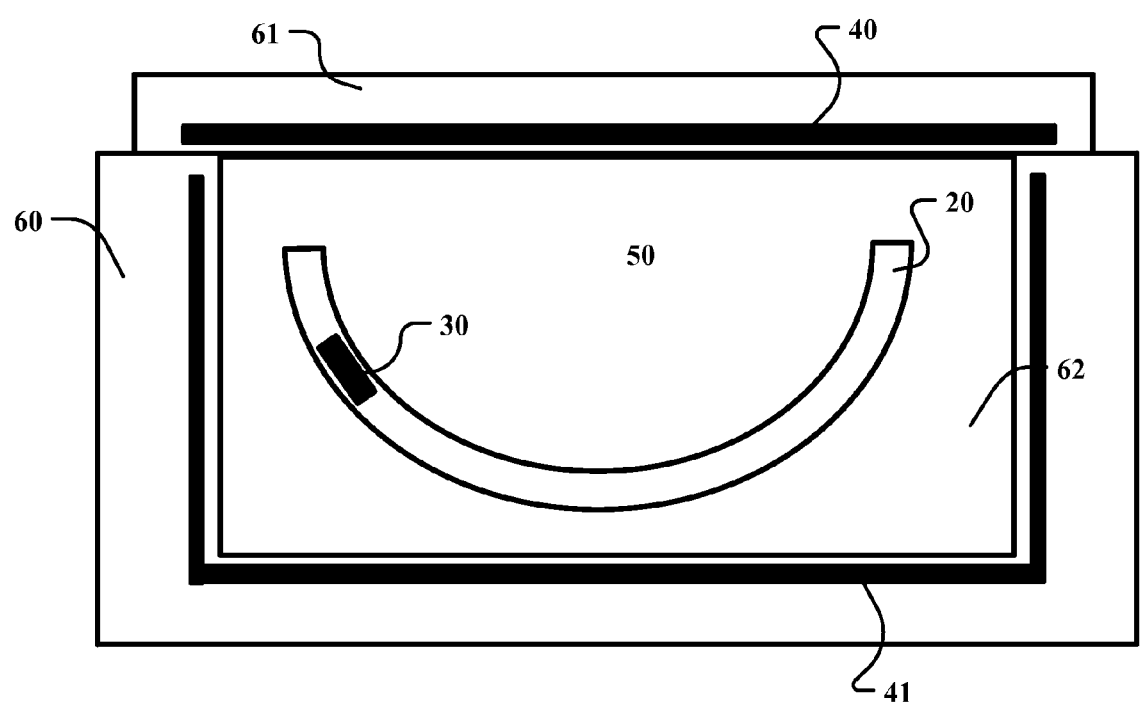
FIG. 1 is a diagram illustrating the wireless communication device and contact lens within an external device.
Figure 2:
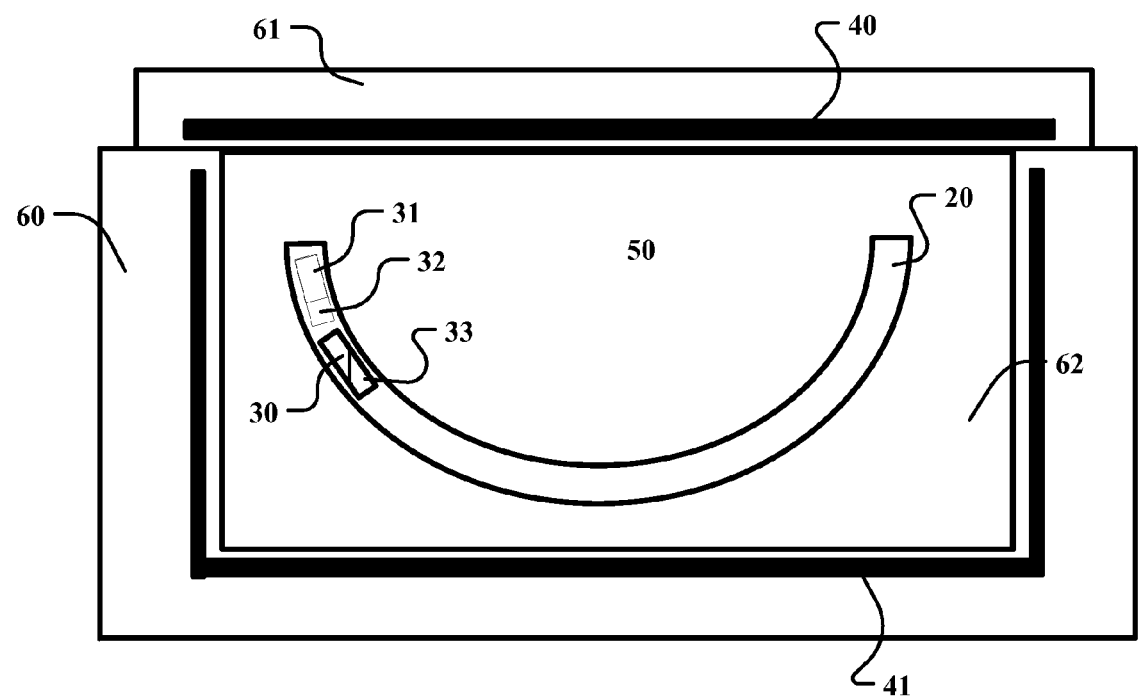
FIG. 2 is a diagram illustrating the antenna, microprocessor, and power source of the contact lens within an external device.
Figure 3:
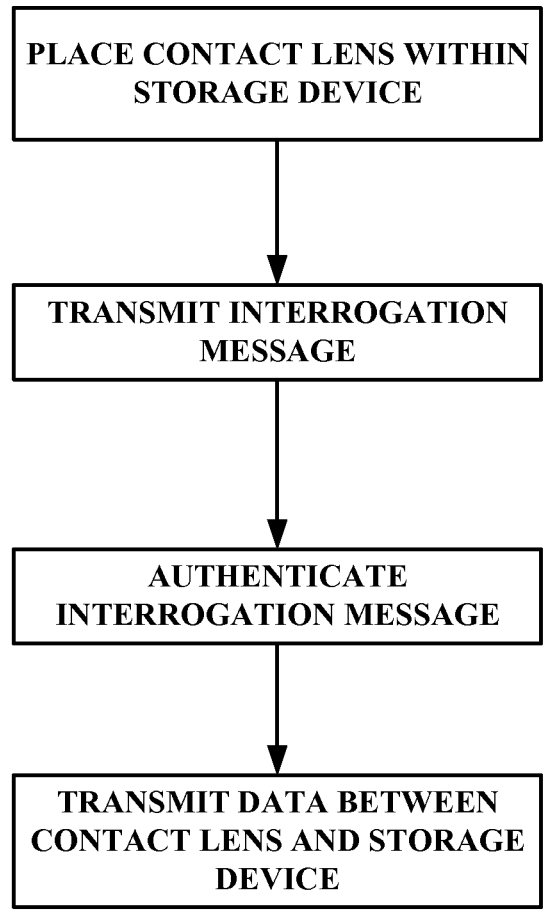
FIG. 3 is a diagram illustrating the method of using the present invention.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention comprises one or a plurality of contact lenses 20, a wireless communication device 30, an antenna assembly 40, 41, a fluid medium 50, and an external device 60. More specifically, the wireless communication device 30 and the antenna assembly 40, 41 are positioned on the external device 60, while the external device 60 is not in in physical contact with the contact lens 20, but is in fluid contact with the contact lens 20 through the fluid medium 50. When in use, the wireless communication device 30 is adapted to interact with the antenna assembly 40, 41 to communicate with the external device 60 through the fluid medium 50. The wireless communication device 30 may be read-only, having a unique key or data sequence, or may be read/write, where data can be written into the wireless communication device 30.

The wireless communication device 30 is positioned on the outer edge of the contact lens 20 and is adapted to send and/or receive wireless data to/from the external device 60 through the fluid medium 50. In the preferred embodiment, the wireless communication device 30 is a passive tag RFID device. More specifically, the wireless communication device 30 is a passive tag RFID device adapted to operate without a power source 31. The wireless communication device 30 is activated when a signal is received from the external device 60. The signal will power the passive RFID device, which will then begin transmitting data. Advantages of a passive tag RFID device include a smaller size and no power requirements, which are paramount with dealing with contact lenses.

In an alternative embodiment, an active tag RFID (powered) device is used. Here, a small battery or capacitor 31 is positioned on the outer edge of the contact lens 20 in electrical communication with the wireless communication device 30 and operates to provide power for transmitting data through the wireless communication device 30. Advantages of an active tag RFID device include longer ranges, improved response time, less interference, and lower radiation. In yet a further alternative embodiment, the wireless communication device 30 is adapted to charge a battery or capacitor 31 used for powering a microprocessor chip 32. Here, the wireless communication device 30 will receive radio frequencies from the external device 60, convert these radio frequencies into electrical energy, and store this electrical energy in the capacitor or battery 31. The energy requirements are low, however, and said battery or capacitor 31 may be easily charged wirelessly in this manner.

The antenna assembly 40, 41 operates to receive data and other radio frequencies, as well as facilitate the transfer of data between the wireless communication device 30 and the external device 60. A first, or top, antenna 40 is positioned in the cap 61, while a second, or bottom, antenna 41 is positioned in the external device 60 adjacent to the fluid chamber 62. In an alternative embodiment, a lens antenna 33 is positioned on the perimeter of the contact lens 20 in electrical communication with the wireless communication device 30, outside of the view of the user. In all embodiment, the lens antenna 33, as well as the wireless communication device 30 and/or battery 31, will not be visible by the user. The antennas is adapted to amplify signals send and received greatly, as these signals are used to activate the wireless communication device 30.

The fluid medium 50 between the contact lens 20 and the external device 60 operates to amplify the RF signals from 1-10 times. The fluid medium 50 also acts as a disinfectant and improves surface wetablility and comfort of the contact lenses 20 during storage in the external device 60. In the preferred embodiment, the fluid medium 50 may be saline water. By utilizing the fluid medium 50, short distance communication between the contact lens 20 and the external case 60 can range from 0.1 mm to 1 cm.

The fluid medium 21 is a sterile, isotonic solution further comprising hyaluronan, sulfobetaine, poloxamine, boric acid, sodium borate, edetate disodium and sodium chloride and preserved with a dual disinfection system comprising polyaminopropyl biguanide and polyquaternium. In the preferred embodiment, the fluid medium comprises an electrical conductivity between 1.6 to 22.2 siemens per meter, a saline concentration between 1% to 25% of the overall solution, and will have a volume between 2.5 $mm^2$ to 10 $mm^2$.

The external device 60 is used to transmit data and/or power to the contact lens 20. In the preferred embodiment, the external device 60 is a contact lens case further comprising a cap 61 and fluid chamber 62, where the contact lens 20 may be stored for 1-8 hours daily. Due to the long storage periods, the external device 60 and contact lens 20 may transmit data and energy even at low transfer speeds or energy levels. For example, data collected during use can be transferred from a microprocessor 32 in the contact lens 20 to the external device 60 at extremely low speeds. Also, energy can be transferred from the external device 60 to the battery or capacitor 32 for wireless charging, thus enabling the external device 60 to operate as a power outlet. Lastly, miscellaneous information such as identification numbers (RFID), logged usage data, and user data (blinking, light exposure) can be transmitted from the contact lens 20 to the external device 60 during this time. For example, the present invention may monitor time used and count usage cycles to notify the user when the contact lens 20 needs replacement or care. As mentioned above, the external device 60 will further comprise an antenna assembly 40, 41 to communicate with the contact lens 20 with less interference, both for data and wireless charging, and the external device 60 will enclose the contact lens 20 in a fluid chamber 62, further reducing interference and increasing the reliability of the transmission.

When in use, the wireless communication device 30 will receive a message from the external device 60, or an interrogation message, once it is in range. In the passive embodiment, the signal strength of the interrogation message will activate the wireless communication device 30. The wireless communication device 30 will authenticate this interrogation message and will respond with identification or other data once authenticated. Alternatively, with an active Tag RFID, the wireless communication device 30 will broadcast an interrogation message, where the external device 60 will receive the message for authentication. In a further alternative embodiment, the interrogation message will operate to wake the wireless communication device 30 from a sleeping state, which will then begin to transmit data with the external device 60 once authenticated.

In the preferred embodiment, the wireless communication device 30 is adapted to fit on the perimeter of a contact lens 20. As such, the size of the wireless communication device 30 will be within the range of 0.05 mm×0.05 mm. The wireless communication will operate in a frequency range of 10 kHz-100 MHz. The wireless communication device 30 is adapted to communicate at a range of 1 cm-1 m. In the alternative embodiment, where an active tag RFID is used with a battery source 31, the frequency range increases to 10 kHz-5 GHz, with a range of 1 cm-100 m.

In a further alternative embodiment, a piezoelectric sensor is used to receive a frequency within a specific range for data transmission or wireless charging. The piezoelectric sensor is sensitive enough to distinguish frequencies, and is adapted to receive only frequencies which can communicate with the wireless communication device 30. The piezoelectric sensor may comprise synthetic piezoelectric ceramics including, but not limited to, barium titanate, lead titanate, lead zirconate titanate, potassium niobate, lithium niobate, lithium tantalite, sodium tungstate, and zinc oxide. Alternatively, the piezoelectric sensor may comprise a polymer piezoelectric such as polyvinylidene fluoride. Lastly, biological piezoelectrics can be used including bone, tendon, silk, wood, enamel, dentin, DNA, and viral protein such as bacteriophage.

In yet a further alternative embodiment, a vibration sensor may be implemented to activate the wireless communication device 30. Here, either a battery 31 or a piezoelectric sensor is adapted to produce an electrical charge when the vibrational sensor is triggered. The vibration sensor can be triggered when the contact lens 20 is removed from the eye or removed from the external device 60. Once a vibration, or lack thereof, is sensed, the vibrational sensor will activate the wireless communication device 30.

In still a further alternative embodiment, the present invention may be paired with a piezoelectric energy harvesting device for powering the wireless communication device 30 and/or vibration sensor. Energy can be harvested from the movement of the eye, blinking, body movement, or other source. A battery or capacitor 31 may be provided to receive and store this energy.

When in use, the user will place a contact lens 20 within an external storage device 60. An interrogation message will be received from the external device 60, which is then authenticated within the contact lens 20. After authentication, wireless data transmission and/or wireless charging may begin between the contact lens 20 and external device 60. This communication and/or charging may last between 2-8 hours, providing ample time for charging and information transfer.

The present invention is manufactured such that the components work in conjunction to provide data transmission and/or wireless charging with an external storage device 60. The method of manufacturing the present invention comprises first electrically connecting the wireless communication device 30 with any microprocessors 32, antennas 33, and/or power sources 31, creating a wireless communication circuit. In the preferred embodiment, any transparent materials may be used to reduce obstructing the vision of the user.

Once the wireless communication circuit is created, it is placed directly into a contact lens mold member, preferably the female mold member, or first (anterior) contact lens mold member. The placement would occur preferably robotically and be coupled with a means of centering the assembly and a means of controlling the depth of the assembly during the filling of the mold with a lens precursor material, which can be understood to be a polymerizable silicone hydrogel lens precursor composition. The polymerizable silicone hydrogel lens precursor composition may be understood to be a pre-polymerized or pre-cured composition suitable for polymerization. In alternative embodiments, the lens precursor material may be comprised of silicone, hydrogel, polyimide, kapton, parylene, or SU-8. Non-stretchable lens precursor materials comprise metals, ceramics, and crystals.

The first contact lens mold member is placed in contact with a second contact lens mold member to form a contact lens mold having a contact lens shaped cavity. Next, the two contact lens mold members are placed in contact with one another to form a contact lens shaped cavity, with the polymerizable silicone hydrogel lens precursor composition and wireless communication circuit positioned within the contact lens shaped cavity. The polymerizable silicone hydrogel lens precursor composition is then cured to form a pre-extracted polymerized silicone hydrogel contact lens product. The contact lens mold is then demolded, where the two mold members are separated. The pre-extracted polymerized silicone hydrogel contact lens product is then separated from the contact lens mold members, or delensed. After delensing, the pre-extracted silicone hydrogel contact lens product is extracted. After extraction, the extracted polymerized silicone hydrogel contact lens product is hydrated with water or an aqueous solution to form a hydrated silicone hydrogel contact lens.

While the above description contains specific details regarding certain elements, sizes, and other teachings, it is understood that embodiments of the invention or any combination of them may be practiced without these specific details. Specifically, although certain materials and shapes are designated in the above embodiments, any suitable materials or shape may be used. These details should not be construed as limitations on the scope of any embodiment, but merely as exemplifications of the presently preferred embodiments. In other instances, well known structures, elements, and techniques have not been shown to clearly explain the details of the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A system for contact lens wireless communication comprising:
   a contact lens;
   a wireless communication device positioned within said contact lens;
   a fluid medium;
   an external storage device in fluid contact with said contact lens through said fluid medium;
   a case wireless communication device positioned within said external storage device; and
   an antenna assembly configured to amplify the wireless signal transmitted and received, wherein a lens antenna is positioned on the outer perimeter of said contact lens, a top antenna is positioned within an external device cap, and a bottom antenna is positioned within said external device around said fluid medium;

wherein said external storage device is configured to send and receive wireless data with said contact lens through said fluid medium.

2. The system for contact lens wireless communication of claim 1, wherein said wireless communication device is positioned on the outer perimeter of said contact lens and is configured to transmit and receive data with said case wireless communication device using radio frequencies.

3. The system for contact lens wireless communication of claim 2, wherein said wireless communication device is a passive Radio Frequency Identification device with no power source having a range between 0-1 m and a frequency range between 10 kHz-100 MHz.

4. The system for contact lens wireless communication of claim 2, wherein said wireless communication device is an active Radio Frequency Identification device with a power source positioned on the outer perimeter of said contact lens having a range between 0-100 m and a frequency range between 10 kHz-5 GHz.

5. The system for contact lens wireless communication of claim 4, wherein said wireless communication device further comprises a microprocessor positioned on the outer perimeter of said contact lens.

6. The system for contact lens wireless communication of claim 1, wherein said fluid medium is an electrolytic fluid antenna configured to improve the wireless signal capacity between said contact lens and said external storage device.

7. The system for contact lens wireless communication of claim 6, wherein said fluid medium further comprises a saline solution configured to disinfect, and improve surface wettability of said contact lens.

8. The system for contact lens wireless communication of claim 1, wherein said external storage device is configured to transmit an interrogation message and said wireless communication device is configured to receive and authenticate said interrogation message.

9. A method for contact lens wireless communication comprising:
    placing a contact lens within an external storage device;
    receiving an interrogation message from said external device;
    authenticating said interrogation message within said contact lens; and
    transmitting data between said contact lens and said external storage device once authenticated;
    wherein said data is transmitted wirelessly between said contact lens and said external storage device.

10. The method of claim 9, wherein said contact lens further comprises a wireless communication device, an antenna, a power source and microprocessor.

11. The method of claim 9, wherein said data is transmitted over a period of 2-8 hours.

* * * * *